United States Patent
Foutch et al.

[11] Patent Number: 5,499,471
[45] Date of Patent: Mar. 19, 1996

[54] RATTLE FOR FISHING LURE

[76] Inventors: Michael J. Foutch, R.R. 5, Southern MHP #72, Carbondale, Ill. 62901; John J. Foutch, 1507 Winter Dr., Freeport, Ill. 61072

[21] Appl. No.: 368,304

[22] Filed: Jan. 3, 1995

[51] Int. Cl.6 .................................................. A01K 85/01
[52] U.S. Cl. ........................................ 43/42.31; 43/42.38
[58] Field of Search ............................... 43/42.31, 42.38, 43/44.81, 44.2

[56] References Cited

U.S. PATENT DOCUMENTS 5,001,856  3/1991  Gentry ................................. 43/42.31
5,038,513  8/1991  Hardin ................................. 43/42.31
5,230,178  7/1993  Dillard ............................. 43/42.31 X Primary Examiner—Samuel M. Heinrich
Assistant Examiner—Jeanne M. Elpel
Attorney, Agent, or Firm—Armstrong, Teasdale, Schlafly & Davis

[57] ABSTRACT

A rattle adapted to be mounted on a fishing lure having a body with a hook depending therefrom, and a skirt secured on the body with a band. The rattle comprises a rattle chamber having at least one rattle member therein. A first arm extends from the chamber and has a hook adjacent its free end for engaging the resilient band. A second arm extends from the chamber and has an opening adjacent its free end for receiving a portion of the hook to secure the rattle thereto.

20 Claims, 1 Drawing Sheet

RATTLE FOR FISHING LURE

BACKGROUND AND SUMMARY OF THE INVENTION

This invention relates to a rattle adapted to be mounted on fishing lures, and in particular to fishing lures having a body with a band thereon, such as the bands used to secure a skirt of filaments on the body of the lure.

Rattles are incorporated into some fishing lures and added to other fishing lures to make the lures more attractive to fish. In adding a rattle to a lure, it has been difficult to attach the lure in a way that it is securely held on the lure, but does not interfere with a fish striking at the lure. Moreover, it has been difficult to attach the rattle in a manner that does not deaden the sounds generated by the rattle.

The rattle of the present invention is adapted to be mounted on fishing lures of the type comprising a body having a hook depending therefrom, and a band extending around the body. Generally, the rattle of the present invention comprises a rattle chamber having at least one rattle member therein. A first arm extends from the chamber, and has a hook adjacent its free end for engaging the band, to secure the rattle. A second arm extends from the chamber, and has an opening adjacent its free end for receiving a portion of the fish hook to secure the rattle.

The rattle chamber is preferably an elongate cylinder, and the first arm extends generally axially from the chamber and the second arm extends generally radially from the chamber.

The rattle quickly, easily and securely mounts to the lure. The first and second arms hold the rattle in place without interfering with fish striking on the lure. The second arm transmits vibrations to the hook, which can resonate, enhancing the effect of the rattle.

These and other features and advantages will be in part apparent, and in part pointed out hereinafter.

DETAILED DESCRIPTION OF THE PREFERRED EMBODIMENT

Corresponding reference numerals indicate correspondence parts throughout the drawings.

DETAILED DESCRIPTION OF THE PREFERRED EMBODIMENT

Figure 1:
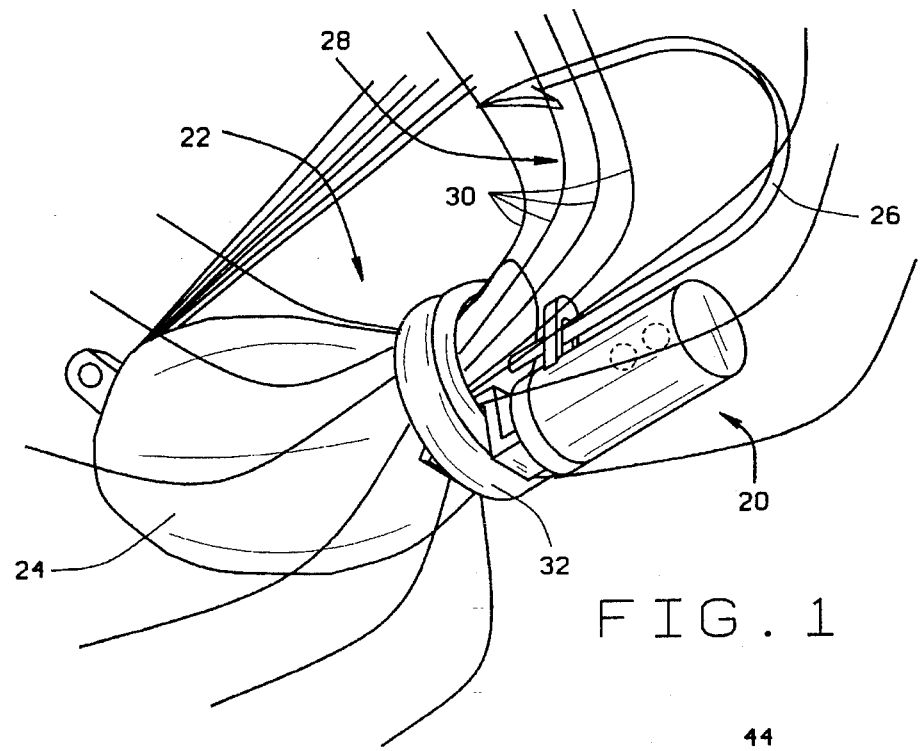
FIG. 1 is a perspective view of a lure with a rattle constructed according to the principles of this invention mounted thereon.
Figure 2:
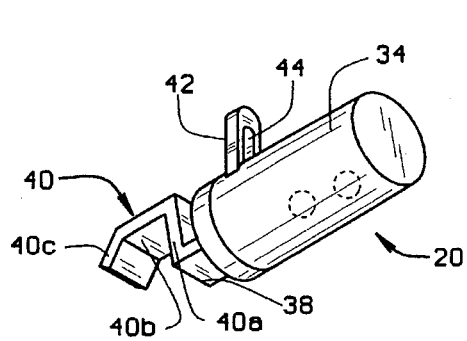
FIG. 2 is a perspective view of the rattle.

A rattle constructed according to the principles of this invention, indicated generally as 20, is shown in FIG. 1 as it would be mounted on a lure 22. The lure 22 is of conventional construction, comprising a body 24, having a fish hook 26 extending therefrom. The jig 22 has a skirt 28 comprising a plurality of filaments 30 secured on the body 24 with a resilient band 32. While band 32 is usually a resilient band, it could also be a thread tied around the body 24.

The rattle 20 comprises a rattle chamber 34, preferably made of plastic having at least one rattle member 36 therein. The rattle member may be spherical weight made of lead, another metal, or some other material. In this preferred embodiment there are two rattle members 36 inside the rattle chamber 34.

A first arm 38 extends from the chamber 34 and has a hook 40 adjacent its free end for engaging the resilient band 32. A second arm 42 extends from the chamber 34, and has an opening 44 adjacent its free end for receiving a portion of the fish hook 26 to secure the rattle to the lure 22.

Figure 3:
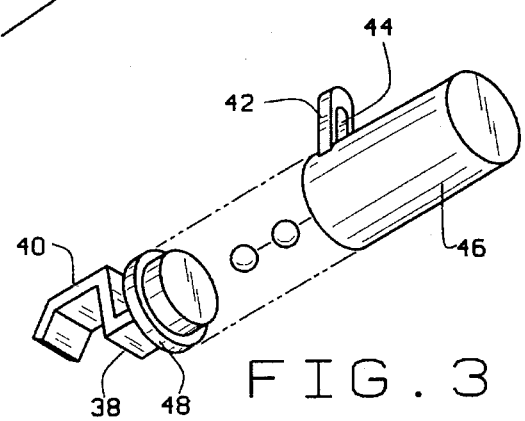
FIG. 3 is an exploded view of the rattle.

In the preferred embodiment, the chamber 34 is an elongate cylinder, with the first arm 38 extending generally axially from the chamber and the second arm 42 extending generally radially from the chamber. The chamber 34 is formed from a cup-shaped member 46 and a cap 48. (See FIG. 3) The first arm 38 is preferably formed integrally with the cap 48, and the second arm 42 is preferably formed integrally with the cup-shaped member 46. The cap 48 is secured to the cup-shaped member 46 with adhesive, sonic welding or other suitable means. In the preferred embodiment, the chamber 34 is thus water tight, although the chamber 34 could be open instead.

Figure 4:
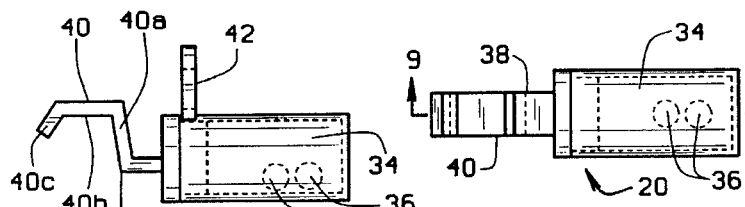
FIG. 4 is a side elevation view of the rattle.
Figure 5:
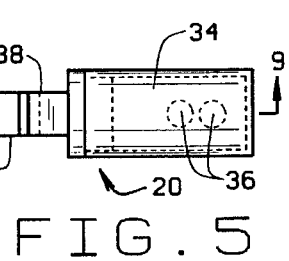
FIG. 5 is a bottom plan view of the rattle.
Figure 6:
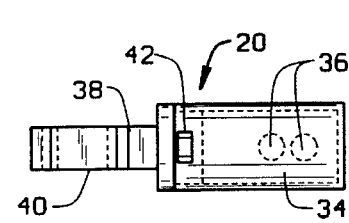
FIG. 6 is a top plan view of the rattle.

As best shown in FIG. 4, the hook 40 on the first arm 38 comprises a first section 40a extending generally forwardly and upwardly (as shown in FIG. 4), a second section 40b extending generally forwardly and horizontally, and a third section 40c extending generally forwardly and downwardly (as shown in FIG. 4). The hook 40 is adapted to engage the band 32 encircling the body 24 of the jig 22.

Figures 7, 8, 9:
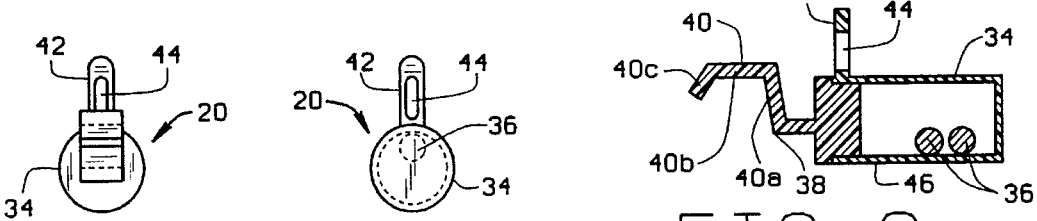
FIG. 7 is a front end elevation view of the rattle.
FIG. 8 is a rear end elevation view of the rattle.
FIG. 9 is a vertical, longitudinal, cross-sectional view of the rattle, taken along the plane of line 9—9 in FIG. 5.

As best shown in FIG. 8, the opening 44 in the second arm is preferably a slot, so that the end of the fish hook 26, including any barb, can fit through the opening. The sides of the slot grip the fish hook 26, securing the rattle to the lure 22, and also transmitting vibration from the rattle to the hook, which can resonate the vibrations.

The first and second arms 38 and 42 securely hold the rattle 20 on the lure 22, without interfering with fish striking the lure. The first arm provides fast and easy attachment to the lure. The second arm transmits vibrations to the hook which can resonate.

What is claimed:

1. A rattle adapted to be mounted on a fishing lure having a body with a fish hook depending therefrom, and a skirt secured on the body with a resilient band, the rattle comprising:

a rattle chamber having at least one rattle member therein;

a first arm extending from the chamber and having a hook adjacent its free end for engaging the resilient band; and a second arm extending from the chamber and having an opening adjacent its free end for receiving a portion of the fish hook to secure the rattle thereto.

2. The rattle according to claim 1 wherein the first and second arms are perpendicular to each other.

3. The rattle according to claim 1 wherein the rattle chamber is an elongate cylinder.

4. The rattle according to claim 3 wherein the first arm extends generally axially from the chamber.

5. The rattle according to claim 4 wherein the second arm extends generally radially from the chamber.

6. The rattle according to claim 3 wherein the second arm extends generally radially from the chamber.

7. The rattle according to claim 1 wherein the chamber comprises a cup-shaped portion and a lid for closing the cup-shaped portion.

8. The rattle according to claim 7 wherein the first arm extends from the lid.

9. The rattle according to claim 8 wherein the second arm extends from the cup-shaped portion.

10. The rattle according to claim 9 wherein the first arm extends generally axially from the chamber.

11. The rattle according to claim 10 wherein the second arm extends generally radially from the chamber.

12. In combination with a fishing lure having a body with a fish hook depending therefrom, and a resilient band around the body, a rattle comprising a rattle chamber having a rattle member therein; a first arm extending from the chamber and having a hook adjacent its free end, engaged by the resilient band, and a second arm extending from the chamber and having an opening adjacent its free end receiving a portion of the fish hook.

13. The combination according to claim 12 wherein the first and second arms are perpendicular.

14. The combination according to claim 12 wherein the rattle chamber is an elongate cylinder.

15. The combination according to claim 14 wherein the first arm extends generally axially from the chamber.

16. The combination according to claim 15 wherein the second arm extends generally radially from the chamber.

17. A fishing lure rattle adapted to be mounted on a fishing lure having a body with a fish hook depending therefrom, and a resilient band on the body, the rattle comprising:

a generally cylindrical rattle chamber having a rattle member therein;

a first arm extending generally axially from the chamber and having a hook adjacent its free end for engaging the resilient band; and a second arm extending generally radially from the chamber and having an opening adjacent its free end for receiving a portion of the fish hook to secure the rattle thereto.

18. The fishing lure rattle according to claim 17 wherein the chamber comprises a generally cup-shaped portion and a lid for closing the cup-shaped portion.

19. The fishing lure rattle according to claim 18 wherein the first arm extends from the cap.

20. The fishing lure rattle according to claim 19 wherein the second arm extends from the cup-shaped portion.

* * * * *